United States Patent
Mao et al.

(10) Patent No.: US 11,543,019 B2
(45) Date of Patent: Jan. 3, 2023

(54) GEAR BOX WITH AN OIL STIRRING BOX

(71) Applicant: NANJING HIGH-SPEED GEAR MANUFACTURING CO., LTD., Jiangsu (CN)

(72) Inventors: Hongpu Mao, Jiangsu (CN); Aimin He, Jiangsu (CN); Yizhong Sun, Jiangsu (CN); Hechao Zhang, Jiangsu (CN); Fei Zhu, Jiangsu (CN)

(73) Assignee: NANJING HIGH-SPEED GEAR MANUFACTURING CO., LTD., Jiangsu (CN)

( * ) Notice: Subject to any disclaimer, the term of this patent is extended or adjusted under 35 U.S.C. 154(b) by 177 days.

(21) Appl. No.: 17/087,668

(22) Filed: Nov. 3, 2020

(65) Prior Publication Data
US 2021/0048098 A1 Feb. 18, 2021

Related U.S. Application Data

(63) Continuation-in-part of application No. PCT/CN2019/123795, filed on Dec. 6, 2019.

(30) Foreign Application Priority Data

Dec. 7, 2018 (CN) .......................... 201811494586.6
Dec. 7, 2018 (CN) .......................... 201822050257.4

(51) Int. Cl.
*F16H 57/04* (2010.01)
*F16H 57/08* (2006.01)

(52) U.S. Cl.
CPC ....... *F16H 57/0427* (2013.01); *F16H 57/045* (2013.01); *F16H 57/082* (2013.01)

(58) Field of Classification Search
CPC .......................... F16H 57/0427; F16H 57/082
See application file for complete search history.

(56) References Cited

U.S. PATENT DOCUMENTS 5,499,902 A * 3/1996 Rockwood .......... F04D 29/2266
417/423.12
5,669,844 A * 9/1997 Homan ............... F16H 57/0483
184/6.12

(Continued)

FOREIGN PATENT DOCUMENTS

| CN | 102705494 A | 10/2012 |
|---|---|---|
| CN | 206439381 U | 8/2017 |

(Continued)

OTHER PUBLICATIONS

ISR for PCT/CN2019/123795 (Mar. 5, 2020).
Extended European Search Report for EP 19892957.2 (Jul. 14, 2022).

*Primary Examiner* — Minh Truong

(57) ABSTRACT

Provided is a gear box including a lubricating oil pool arranged at a bottom of the gear box, and at least one oil stirring box that includes an oil storage chamber, the oil storage chamber being provided with an oil scooping port and at least one oil outlet. The at least one oil stirring box is arranged on a rotary component in the gear box and rotatable along with the rotary component. A lubricating oil in the lubricating oil pool is allowed to flow through the oil scooping port into the oil storage chamber when the at least one oil stirring box rotates to the lubricating oil pool. The lubricating oil in the oil storage chamber is further allowed to flow out of the at least one oil outlet to a lubrication point when the oil stirring box rotates to the vicinity of the lubrication point.

11 Claims, 3 Drawing Sheets

(56) References Cited

U.S. PATENT DOCUMENTS

| | | | | |
|---|---|---|---|---|
| 5,810,116 | A * | 9/1998 | Kaptrosky | F16C 33/6659 |
| | | | | 184/6.12 |
| 6,039,667 | A | 3/2000 | Schunck | |
| 6,200,037 | B1 * | 3/2001 | Braun | F16C 33/6659 |
| | | | | 384/466 |
| 8,366,578 | B2 * | 2/2013 | Zeirke | F16H 57/0482 |
| | | | | 475/160 |
| 11,286,854 | B2 * | 3/2022 | Coffin | F01D 25/18 |
| 2010/0113205 | A1 | 5/2010 | Lasko | |
| 2017/0138460 | A1 * | 5/2017 | Bequé | F16H 57/0442 |
| 2018/0259057 | A1 * | 9/2018 | Kuboki | F16H 57/043 |

FOREIGN PATENT DOCUMENTS

| | | |
|---|---|---|
| CN | 108757904 A | 11/2018 |
| CN | 209458386 U | 10/2019 |
| DE | 812749 C | 9/1951 |
| JP | H08270763 A | 10/1996 |

\* cited by examiner

GEAR BOX WITH AN OIL STIRRING BOX

CROSS-REFERENCE TO RELATED APPLICATIONS

The present application is a continuation-in-part of co-pending International Patent Application Number PCT/CN2019/123795, filed on Dec. 6, 2019, which claims the priority of Chinese patent application No. 201811494586.6 and Chinese patent application No. 201822050257.4 that are filed on Dec. 7, 2018, disclosures of which are incorporated herein by reference in their entireties.

TECHNICAL FIELD

The present application relates to the technical field of gear box lubrication, for example, relates to a gear box.

BACKGROUND

The gear box is an important assembly widely used in mechanical transmission, and gears are a basic part in gear box transmission. In order to reduce the friction generated in the gear meshing process, typically the gears need to be lubricated using a gear lubricating oil. However, in the gear lubrication process, the spattered lubricating oil is often insufficient in amount due to a relatively low liquid level. To increase the amount of spattered lubricating oil, in related art an oil scraping plate or oil scraping block is typically arranged in the gear box. Yet, the oil scraping plate or oil scraping block can provide very limited amount of oil, and require a particularly high assembly accuracy. In addition to the oil scraping plate or the oil scraping block, an oil collecting groove may alternatively be cast or machined in the inner chamber of the gear box, whereby the spattered lubricating oil can be collected by the oil collecting groove. Nevertheless, the oil collecting groove increases the difficulty of casting or machining the gear box, and the amount of spattered lubricating oil is also very limited.

To increase the amount of spattered lubricating oil, the oil level of the gear box needs to be increased, but if the oil level is too high, it will increase the oil stirring loss and reduce the transmission efficiency of the gear box. In addition, the risk of oil leakage at mechanical seals of the gear box is also increased.

Therefore, it is an urgent technical problem that needs to be solved as to how to increase the amount of spattered lubricating oil without increasing the oil level of the gear box.

SUMMARY

The present application provides a gear box. The gear box has a good lubrication effect, a high transmission efficiency, a high reliability and lubricating oil is not prone to leakage.

The gear box includes a lubricating oil pool disposed at a bottom of the gear box and at least one oil stirring box. The at least one oil stirring box includes an oil storage chamber, the oil storage chamber being provided with an oil scooping port and an oil outlet, and the at least one oil stirring box is disposed on a rotary component in the gear box and is operative to rotate along with the rotary component.

The oil scooping port is configured to allow a lubricating oil in the lubricating oil pool to enter the oil storage chamber through the oil scooping port when the at least one oil stirring box rotates to the lubricating oil pool.

The at least one oil outlet is configured to allow the lubricating oil in the oil storage chamber to flow out of the at least one oil outlet to a lubrication point when the at least one oil stirring box rotates to the vicinity of the lubrication point.

In some embodiments, the at least one oil stirring box includes a first cover plate, a second cover plate and a plurality of side plates, the first cover plate and the second cover plate are disposed opposite to each other, one end of each of the plurality of side plates is connected to the first cover plate, the other end of the each of the plurality of side plates is connected to the second cover plate, and the first cover plate, the second cover plate and the plurality of side plates enclose with each other to form the oil storage chamber. In some embodiments, the first cover plate is connected to the rotary component, the oil scooping port and the at least one oil outlet are provided in different side plates of the plurality of side plates, an opening direction of the oil scooping port is disposed toward a direction of rotation of the rotary component, and the opening direction of the oil scooping port is different from an opening direction of the at least one oil outlet.

In some embodiments, the plurality of side plates includes a front side plate, a left side plate, a rear side plate and a right side plate that are connected end to end in sequence. The front side plate and the rear side plate are disposed opposite to each other, the left side plate and the right side plate are disposed opposite to each other, the oil scooping port is disposed on the front side plate, and the at least one oil outlet is disposed in the left side plate or the right side plate. In some embodiments, the at least one oil outlet comprises a plurality of oil outlets, which are disposed at intervals in the left side plate or in the right side plate.

In some embodiments, the at least one oil outlet is provided with an oil guiding structure.

In some embodiments, the oil guiding structure includes an oil guiding pipe or an oil guiding groove.

In some embodiment, the at least one oil stirring box comprises a plurality of oil stirring boxes, which are distributed along a circumferential direction of the rotary component.

In some embodiments, the at least one oil stirring box is a welded metal part, a bent metal part, or is made of a plastic material or a cast iron material, or a combination thereof.

In some embodiments, the at least one oil stirring box is an assembly of a plurality of sub-components or is an integrally formed part.

In some embodiments, the at least one oil stirring box is fixed to the rotary component of the gear box through a connecting part, or is integrally formed with the rotary component.

In some embodiments, opening directions of oil scooping ports on the plurality of the oil stirring boxes are different from each other.

According to another aspect of the present application, the present application provided a gear box that includes a lubricating oil pool disposed at a bottom of the gear box and at least one oil stirring box. The at least one oil stirring box includes an oil storage chamber, which is provided with an oil scooping port and at least one oil outlet. The at least one oil stirring box is arranged on a rotary component in the gear box and is operative to rotate along with the rotary component. The oil scooping port is configured to allow a lubricating oil in the lubricating oil pool to enter the oil storage chamber through the oil scooping port when the at least one oil stirring box rotates to the lubricating oil pool. The at least one oil outlet is configured to allow the lubricating oil in the oil storage chamber to flow out of the at least one oil outlet and be guided to a lubrication point via an oil guiding structure when the oil stirring box rotates to the vicinity of the lubrication point.

In some embodiments, the at least one oil stirring box includes a first cover plate, a second cover plate, and a plurality of side plates. The first cover plate and the second cover plate are arranged opposite to each other. One end of each of the plurality of side plates is connected to the first cover plate, another end of the side plate is connected to the second cover plate. The first cover plate, the second cover plate, and the plurality of side plates enclose with each other to form the oil storage chamber.

In some embodiments, the first cover plate is connected to the rotary component, the oil scooping port and the at least one oil outlet are provided in different side plates of the plurality of side plates. The oil scooping port is arranged to have an opening direction toward a direction of rotation of the rotary component, and the opening direction of the oil scooping port is different than that of the at least one oil outlet.

In some embodiments, the plurality of side plates include a front side plate, a left side plate, a rear side plate, and a right side plate that are connected end to end in sequence. The front side plate and the rear side plate are arranged opposite to each other. The left side plate and the right side plate are arranged opposite to each other. The oil scooping port is provided in the front side plate, and the at least one oil outlet is provided in the left side plate or in the right side plate.

In some embodiments, the at least one oil outlet includes a plurality of oil outlets, which are provided at intervals in the left side plate or in the right side plate.

In some embodiments, the oil guiding structure is an oil guiding pipe or an oil guiding groove.

In some embodiments, the at least one oil stirring box includes a plurality of oil stirring boxes, which are distributed along a circumferential direction of the rotary component.

In some embodiments, the at least one oil stirring box is a welded metal part, a bent metal part, or is made a plastic material or cast iron material, or a combination thereof.

The present application provides a gear box, the oil stirring box is disposed on the rotary component of the gear box, and the lubricating oil in the lubricating oil pool is transported to a high level by using the oil stirring box, such that a lubrication effect on the lubrication point of the gear box is improved without affecting the transmission efficiency of the gear box.

REFERENCE SIGNS

Figure 1:
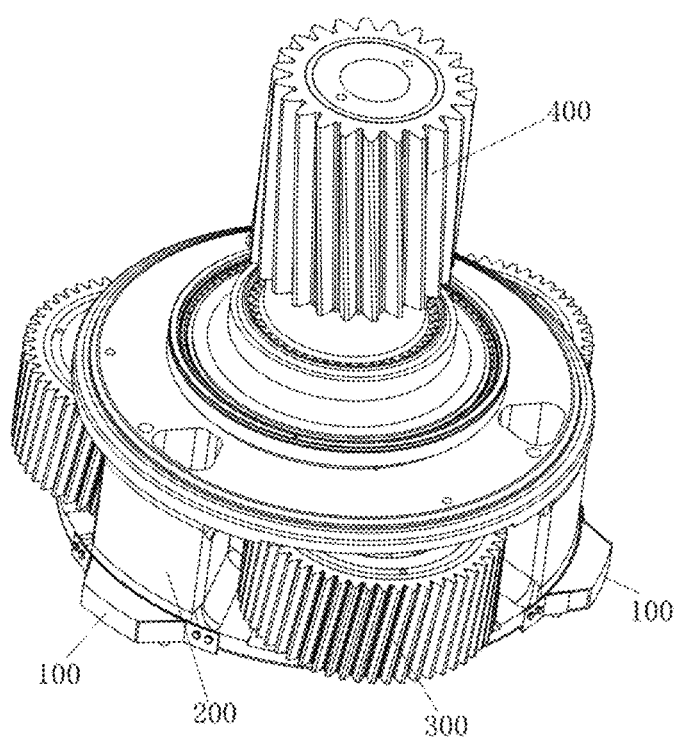
FIG. 1 is a perspective view of a partial structure of a gear box according to an embodiment of the present application.

1 Oil scooping port
2 Oil outlet
3 First cover plate
4 Second cover plate
5 Front side plate
6 Left side plate
7 Rear side plate
8 Connecting hole
100 Oil stirring box
200 Planet carrier
300 Planet gear
400 Drive shaft

DETAILED DESCRIPTION

Technical solutions of the present application are further described below through specific embodiments in conjunction with the drawings.

Figure 2:
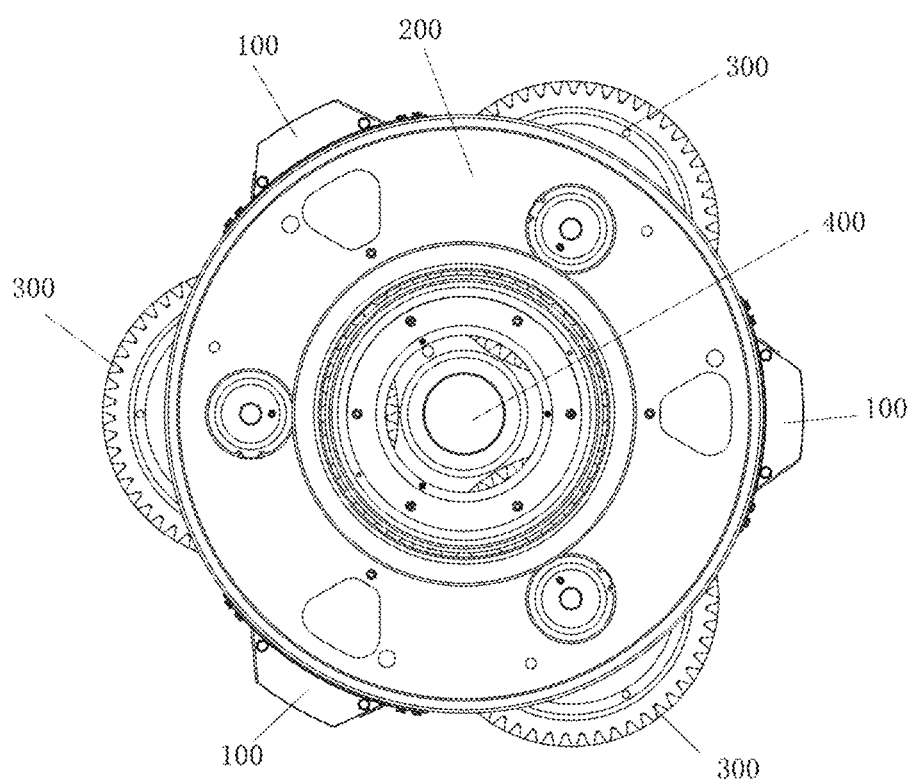
FIG. 2 is a top view of a partial structure of a gear box according to an embodiment of the present application.

This embodiment provides a gear box. As illustrated in FIG. 1 and FIG. 2, the gear box includes a case (not shown in the figure) and a planet gear train mechanism disposed in the case. The planet gear train mechanism specifically includes a planet carrier 200, a plurality of planet gears 300, a sun gear (not shown in the figure) and a gear ring (not shown in the figure). A lubricating oil pool is disposed at a bottom of the case, the planet gears 300 are mounted on the planet carrier 200, the sun gear is disposed in the middle of the plurality of planet gears 300, the plurality of planet gears 300 are disposed in the gear ring and meshed with the gear ring at an outer periphery, and meanwhile, the plurality of planet gears 300 are meshed with the sun gear at an inner periphery.

A top of the planet carrier 200 is provided with a through hole allowing a drive shaft 400 to pass through, and an inner wall of the through hole is provided with a gear tooth structure. One end of the drive shaft 400 extending into the through hole is also provided with a gear tooth structure. The gear tooth structure on the drive shaft 400 is meshed with the gear tooth structure on the planet carrier 200. When the drive shaft 400 rotates under the drive of a power source, the planet carrier 200 can rotate accordingly.

The gear box further includes the lubricating oil pool (not shown in the figure) and at least one oil stirring box 100. The lubricating oil pool is disposed at a bottom of the gear box, and the at least one oil stirring box 100 is mounted on an outer side wall of the planet carrier 200. The at least one oil stirring box 100 includes an oil storage chamber, and the oil storage chamber is provided with an oil scooping port 1 and at least one oil outlet 2. When the drive shaft 400 drives the planet carrier 200 to rotate, the at least one oil stirring box 100 disposed on the side wall of the planet carrier 200 can also rotate accordingly, such that the at least one oil stirring box 100 is immersed in the lubricating oil pool of the gear box. After the at least one oil stirring box 100 is immersed in the lubricating oil pool of the gear box, lubricating oil in the lubricating oil pool can enter the oil storage chamber through the oil scooping port 1 for a temporary storage. When the at least one oil stirring box 100 continues to rotate with the planet carrier 200, the at least one oil stirring box 100 can reach a relatively high position away from the lubricating oil pool, and when the at least one oil stirring box 100 reaches a lubrication point, the lubricating oil can flow out from the at least one oil outlet 2 to the lubrication point, thereby achieving lubrication of the lubrication point. The at least one oil stirring box 100 is disposed on the planet carrier 200 of the gear box, such that one or more lubrication points of the gear box can be effectively lubricated when an oil level of the lubricating oil pool is relatively low, thereby avoiding mechanical wear caused by insufficient lubrication, and facilitating an improvement of a service life and a transmission stability of the gear box.

Figure 3:
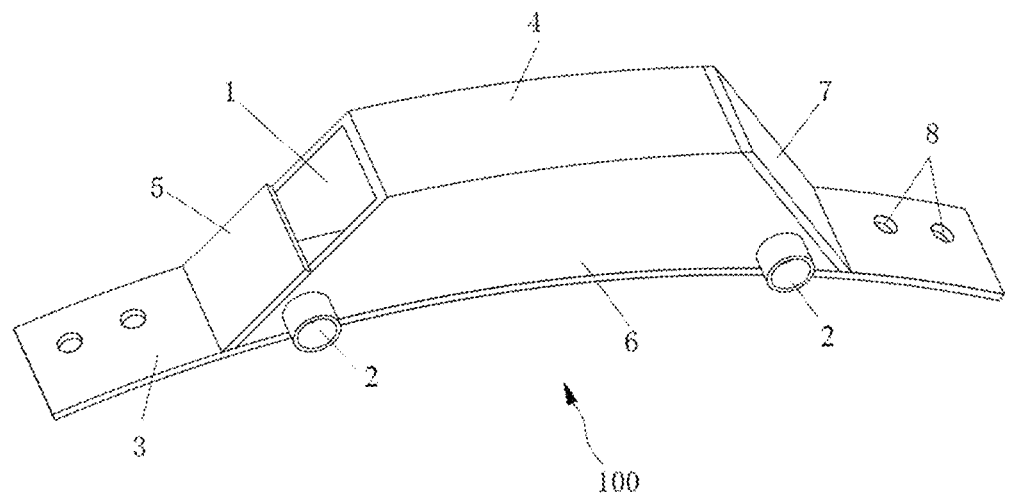
FIG. 3 is a perspective view of an oil stirring box according to an embodiment of the present application.
Figure 4:
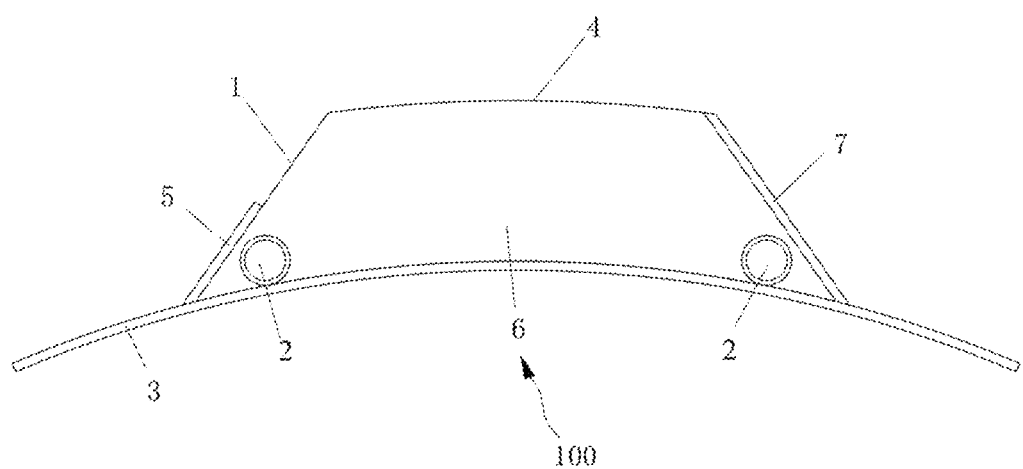
FIG. 4 is a front view of an oil stirring box according to an embodiment of the present application.

As illustrated in FIG. 3 and FIG. 4, the at least one oil stirring box 100 includes a first cover plate 3, a second cover plate 4 and a plurality of side plates, and the first cover plate 3 and the second cover plate 4 are disposed opposite to each other. The first cover plate 3 is an arc-shaped plate fixedly connected to the planet carrier 200. In order to facilitate fixing the first cover plate 3 to the planet carrier 200, a length of the first cover plate 3 is increased, the first cover plate 3 is disposed by protruding a side plate, and connecting holes 8 are provided at one end of a protruding side plate. A connecting member is used to pass through the connecting holes 8, such that the at least one oil stirring box 100 is fixed to the planet carrier 200. Of course, in addition to being connected by the connecting member, other connecting modes may further be used.

The side plate is disposed between the first cover plate 3 and the second cover plate 4, one end of each side plate is connected to the first cover plate 3, and the other end of each side plate is connected to the second cover plate 4. The first cover plate 3, the second cover plate 4 and a plurality of side plates enclose with each other to form the oil storage chamber. Positions of the oil scooping port 1 and the at least one oil outlet 2 are not specifically limited. For example, the oil scooping port 1 and the at least one oil outlet 2 may be disposed on the second cover plate 4 or on the side plate, as long as the lubricating oil can be stored into the oil storage chamber smoothly and the lubricating oil can be transported to the lubricating point smoothly. In this embodiment, in order to increase the amount of lubricating oil entering the oil storage chamber and to prevent the lubricating oil from flowing out of the at least one oil outlet 2 prematurely, the oil scooping port 1 and the at least one oil outlet 2 are provided in different side plates. An opening direction of the oil scooping port 1 is disposed toward a direction of rotation of the planet carrier 200, and an opening direction of the at least one oil outlet 2 is different from the opening direction of the oil scooping port 1.

The number of side plates is determined according to the number of side lengths of the first cover plate 3 and the second cover plate 4, and may be, for example, three, four, five or more. A shape of the side plate is determined by shapes of the first cover plate 3 and the second cover plate 4, and may be, for example, a triangle, a trapezoid, a square or other shapes. In other embodiments, the plurality of side plates may also be formed by bending one plate. In this embodiment, since both the first cover plate 3 and the second cover plate 4 are cuboids, the number of side plates is four. The four side plates are a front side plate 5, a left side plate 6, a rear side plate 7 and a right side plate respectively. The front side plate 5 and the rear side plate 7 are disposed opposite to each other, and the left side plate 6 and the right side plate are disposed opposite to each other. When the planet carrier 200 rotates, the front side plate 5 is disposed at the front of the at least one oil stirring box 100, and the rear side plate 7 is disposed at the rear of the at least one oil stirring box 100. In FIG. 3 and FIG. 4, a left side is defined as a front side and a right side is defined as a rear side. The oil scooping port 1 is disposed on the front side plate 5, and the at least one oil outlet 2 is disposed in the left side plate 6. The oil scooping port 1 is disposed on the front side plate 5, such that it is convenient for the lubricating oil to enter the oil storage chamber. The at least one oil outlet 2 is disposed in the left side plate 6, such that the lubricating oil can be prevented from directly flowing out of the at least one oil outlet 2 after entering the oil storage chamber through the oil scooping port 1. Of course, in addition to the left side plate 6, the at least one oil outlet 2 may further be disposed in the right side plate. An opening area of the at least one oil outlet 2 is smaller than an opening area of the oil scooping port 1, such that time required for outflow of the lubricating oil can be prolonged.

In order to reduce resistance on the at least one oil stirring box 100 when the at least one oil stirring box 100 passes through the lubricating oil pool and reduce an efficiency loss when the at least one oil stirring box 100 moves in the lubricating oil, the front side plate 5 is inclined in a direction of the rear side plate 7. As illustrated in FIG. 3 and FIG. 4, the front side plate 5 is disposed at an acute angle with respect to the first cover plate 3, and the front side plate 5 is disposed at an obtuse angle with respect to the second cover plate 4. The rear side plate 7 is disposed at an acute angle with respect to the first cover plate 3, and the left side plate 6 is disposed at an obtuse angle with respect to the second cover plate 4.

Since the second cover plate 4 is closest to the lubricating oil pool when the at least one oil stirring box 100 rotates to the lubricating oil pool, in this embodiment, the oil scooping port 1 is disposed at one end of the front side plate 5 close to the second cover plate 4, thereby increasing the amount of lubricating oil entering the oil storage chamber. Moreover, the opening area of the oil scooping port 1 is configured to be smaller than an area of the front side plate 5, and such arrangement can further ensure that when the at least one oil stirring box 100 rotates to a highest point away from the lubricating oil pool, the lubricating oil can be stored below the oil scooping port 1 in the oil storage chamber, thereby preventing the lubricating oil from flowing out of the oil scooping port 1. The at least one oil outlet 2 is disposed at one end of the left side plate 6 close to the first cover plate 3, such that a distance between the at least one oil outlet 2 and the oil scooping port 1 is increased, thereby preventing the lubricating oil from flowing out of the at least one oil outlet 2 prematurely.

In order to simultaneously lubricate a plurality of lubrication points, the at least one oil outlet 2 may be include a plurality of oil outlets 2. In this embodiment, as illustrated in FIG. 3 and FIG. 4, the number of the oil outlets 2 is two, where one of the two oil outlets 2 is disposed at one end of the left side plate 6 and the other oil outlet 2 is disposed at the other end of the left side plate 6. As illustrated in FIG. 2, when the planet carrier rotates in a counterclockwise direction, in a process that the at least one oil stirring box 100 moves away from the lubricating oil pool to the highest point, the lubricating oil flows out mainly through an oil outlet 2 near one end of the front side plate 5; and in a process that the at least one oil stirring box 100 approaches the lubricating oil pool from the highest point, the lubricating oil flows out mainly through an oil outlet 2 near one end of the rear side plate 7. Moreover, in order to accurately lead the lubricating oil to the lubrication point and improve the lubricating effect, an oil guiding structure may further be disposed on the oil outlet 2. One end of the oil guiding structure is connected to the oil outlet 2, and the other end is connected to the lubrication point. Specifically, the oil guiding structure may be a structure such as an oil guiding pipe or an oil guiding groove. Of course, in other embodiments, the number of oil outlets 2 may further be specifically set according to actual requirements.

In order to further improve the lubrication effect, in this embodiment, the at least one oil stirring box 100 may include a plurality of oil stirring boxes 100. A plurality of oil stirring boxes 100 are distributed along a circumferential direction of the planet carrier 200, and optionally, they may be uniformly distributed. Opening directions and opening positions of oil scooping ports 1 on the oil stirring boxes 100 may be the same or different from each other. When the planet carrier 200 rotates in only one direction, that is, the planet carrier 200 only rotates in a forward direction or in a reverse direction, the opening directions and the opening positions may be selected as the same. However, when the planet carrier 200 needs to rotate both forward and backward, the opening directions and the opening positions may be selected to be different.

In some embodiments, the at least oil stirring box may be welded metal part, a bent metal part, or is made of a plastic material or a cast iron material, or a combination thereof.

In some embodiments, the at least one oil stirring box may be an assembly of a plurality of sub-components or is an integrally formed part.

In some embodiments, the at least one oil stirring box may be fixed to the rotary component of the gear box through a connecting part, or is integrally formed with the rotary component.

What is claimed is:

1. A gear box, comprising:
   a planet carrier, comprising a first annular side plate, a second annular side plate and a connecting portion connecting the first annular side plate to the second annular side plate;
   a plurality of planet gears, disposed between the first annular side plate and the second annular side plate;
   a lubricating oil pool, disposed at a bottom of the gear box; and
   at least one oil stirring box, comprising an oil storage chamber, the oil storage chamber being provided with an oil scooping port and at least one oil outlet, wherein the at least one oil stirring box is arranged on the planet carrier and is operative to rotate along with the planet carrier;
   wherein the oil scooping port is configured to allow a lubricating oil in the lubricating oil pool to enter the oil storage chamber through the oil scooping port in response to the at least one oil stirring box rotating to the lubricating oil pool; and
   in response to the at least one oil stirring box rotating to a vicinity of a lubrication point, the at least one oil outlet is configured to allow the lubricating oil in the oil storage chamber to flow out of the at least one oil outlet to the lubrication point;
   wherein the at least one oil stirring box comprises a first cover plate, a second cover plate, and a plurality of side plates, wherein the first cover plate and the second cover plate are arranged opposite to each other, one end of each of the plurality of side plates is connected to the first cover plate, another end of the side plate is connected to the second cover plate, and wherein the first cover plate, the second cover plate, and the plurality of side plates enclose with each other to form the oil storage chamber; and
   wherein the first cover plate is an arc-shaped plate fixed to an outer circumferential surface of the first annular side plate of the planet carrier.

2. The gear box of claim 1, wherein the oil scooping port and the at least one oil outlet are provided in different side plates of the plurality of side plates, wherein the oil scooping port is arranged to have an opening direction toward a direction of rotation of the planet carrier, and the opening direction of the oil scooping port is different than that of the at least one oil outlet.

3. The gear box of claim 1, wherein the plurality of side plates comprises a front side plate, a left side plate, a rear side plate, and a right side plate that are connected end to end in sequence, wherein the front side plate and the rear side plate are arranged opposite to each other, the left side plate and the right side plate are arranged opposite to each other, the oil scooping port is provided in the front side plate, and the at least one oil outlet is provided in the left side plate or in the right side plate.

4. The gear box of claim 3, wherein the at least one oil outlet comprises a plurality of oil outlets, which are provided at intervals in the left side plate or in the right side plate.

5. The gear box of claim 1, wherein the at least one oil outlet is provided with an oil guiding structure.

6. The gear box of claim 5, wherein the oil guiding structure is an oil guiding pipe or an oil guiding groove.

7. The gear box of claim 1, wherein the at least one oil stirring box comprises a plurality of oil stirring boxes, which are distributed along a circumferential direction of the planet carrier.

8. The gear box of claim 7, wherein the oil scooping ports in the plurality of the oil stirring boxes have different opening directions.

9. The gear box of claim 1, wherein the at least one oil stirring box is a welded metal part, a bent metal part, or is made of a plastic material or a cast iron material, or a combination thereof.

10. The gear box of claim 1, wherein the at least one oil stirring box is an assembly of a plurality of sub-components or is an integrally formed part.

11. The gear box of claim 1, wherein the at least one oil stirring box is fixed to the planet carrier of the gear box through a connecting part, or is integrally formed with the rotary component.

* * * * *